United States Patent [19]
Egawa

[11] Patent Number: 6,035,138
[45] Date of Patent: Mar. 7, 2000

[54] SENSOR APPARATUS APPLIED TO DISTANCE MEASURING APPARATUS, AND METHOD FOR CONTROLLING SENSOR APPARATUS

[75] Inventor: Akira Egawa, Kawasaki, Japan

[73] Assignee: Canon Kabushiki Kaisha, Tokyo, Japan

[21] Appl. No.: 09/231,796

[22] Filed: Jan. 15, 1999

[30] Foreign Application Priority Data

Jan. 29, 1998 [JP] Japan .................................. 10-016487
Jan. 30, 1998 [JP] Japan .................................. 10-018415

[51] Int. Cl.$^7$ .............................. G03B 13/36; G01C 3/00
[52] U.S. Cl. ....................... 396/106; 250/201.4; 356/3.08
[58] Field of Search ..................... 396/106, 109; 356/3.08; 250/201.4, 201.6

[56] References Cited

U.S. PATENT DOCUMENTS 5,808,726  9/1998  Egawa et al. ..................... 250/201.6 X
5,850,282  12/1998  Egawa ...................... 356/3.08
5,864,720  1/1999  Miyanari ................. 396/106
5,870,178  2/1999  Egawa et al. ........................ 250/201.6

FOREIGN PATENT DOCUMENTS 60-105270  6/1985  Japan .
5-22843   3/1993  Japan .
8-233571  9/1996  Japan .
8-320223  12/1996  Japan .

*Primary Examiner*—W. B. Perkey
*Attorney, Agent, or Firm*—Fitzpatrick, Cella, Harper & Scinto

[57] ABSTRACT

A sensor apparatus which accumulates charges, generated in a sensor array having a plurality of photoelectric conversion elements, in a plurality of accumulation units, and integrates the charges using transfer units having a less number of transfer sections than the number of accumulation units. The plurality of photoelectric conversion elements are grouped into a plurality of groups, a part of the groups is selected, and charges generated by photoelectric conversion elements which belong to the selected group or groups are integrated using the transfer unit.

20 Claims, 5 Drawing Sheets

SENSOR APPARATUS APPLIED TO DISTANCE MEASURING APPARATUS, AND METHOD FOR CONTROLLING SENSOR APPARATUS

BACKGROUND OF THE INVENTION

The present invention relates to a sensor apparatus applied to a distance measuring apparatus and a method for controlling the sensor apparatus and, more specifically, a sensor apparatus using a ring-shaped charge transfer device, applied to an automatic focusing mechanism of a camera, and a method for controlling the sensor apparatus.

Conventionally, a distance measuring device which circulates accumulated charges, obtained by performing photoelectric conversion of light reflected by an object to be measured, using a ring-shaped charge transfer device, such as CCD, to integrate the light and measures the distance to the object on the basis of voltages of the integrated charges has been proposed by the Japanese Patent Publication No. 5-22843. Further, a modified distance measuring apparatus, which is briefly shown in FIG. 5, has been proposed by the Japanese Patent Application Laid-Open No. 8-233571.

Referring to FIG. 5, a light-emitting device 1 turns on and off at predetermined period. Light emitted by the light-emitting device 1 projects on an object (not shown) via a projection lens 2. From the object, light due to the light emitted by the light-emitting device 1 when it is on and external light, and light due to external light when the light-emitting device 1 is off is alternately received. The reflected light incidents on a sensor array 55 composed of sensor elements, i.e., photoelectric conversion elements, S1 to S4 of a sensor apparatus 54 via a light-receiving lens 3.

Charges generated by the sensor elements S1 to S4 while the light-emitting device 1 is on are transferred to accumulation units ST2 via an electronic shutter ICG and sorting units ST01 to ST04. Similarly, charges generated by the sensor elements S1 to S4 while the light-emitting device 1 is off are transferred to accumulation units ST1 via the electronic shutter ICG and the sorting units ST01 to ST04.

Note, an initialization unit CCLR performs initialization before initiating integration of charges. During the initialization, the sorting units ST01 to ST04 are not operated so that no charge is transferred to the accumulation units ST1 and ST2. Further, the electronic shutter ICG is for controlling an amount of charge to be accumulated when a charge converted from light is very large. The electronic shutter ICG also has a function of draining charges generated by the sensor elements S1 to S4 during the initialization of pixels C1 to C8 of a ring-shaped transfer unit 7, which will be explained later.

After charges generated while the light-emitting device 1 is on and charges generated while the light-emitting device is off are accumulated in the accumulation units ST2 and ST1, respectively, they are transferred to pixels A1 to A8 of a charge transfer unit 56 via shift gates SH, further transferred to the pixels C1 to C8 of the ring-shaped transfer unit 7 via the pixels B1 to B4 in synchronization with the on/off operation of the light-emitting device 1. Since the emission of light and the transference of charges are performed in synchronization with each other, charges converted by the respective sensor elements S1 to S4 when the light-emitting device 1 is on and off are respectively accumulated in the pixels C1 to C8.

A skim unit 8 composed of elements SK1 to SK3 skims a predetermined amount of charges which are unnecessary if a pair of charge amounts, obtained when the light-emitting device 1 is on and off, are large, via a clear unit SCLR, thereby preventing the pixels C1 to C8 of the ring-shaped transfer unit 7 from being saturated. Note, since charges are accumulated in the pairs of accumulation units ST1 and ST2, corresponding to the respective sensor elements S1 to S4, by obtaining a difference between the charges accumulated in each pair of the accumulation units ST1 and ST2, a signal component only due to light emitted by the light-emitting device 1 is obtained.

A distance measuring operation in a so-called active mode performed by emitting light is explained above. By keeping the light-emitting device 1 off, omitting skimming operation by the skim unit 8, and reading out the signals from the pixels C1 to C8 without taking differences between charges corresponding to pairs of the accumulation units ST1 and ST2, a known distance measuring operation is performed in a passive mode.

According to the configuration as described above, by turning on/off the light-emitting device 1 repeatedly, a signal component from which effects of external light and noise are removed is obtained as an output signal S from the ring-shaped transfer unit 7 via an amplifier FG. Thus, by using two sensor devices, having the same configuration as the sensor device 54, arranged at a predetermined interval, and performing correlation operation utilizing the principle of trigonometry on the basis of output signals S from the respective sensor devices, the distance to the object is measured with high precision.

The above explanation, with reference to FIG. 5, is about a light beam t2 emitted from the center of the light-emitting device 1, and reflected light r2 due to the light beam t2 is received by the sensor elements S1 to S4 of the sensor array 55. However, if light beams t1, t2 and t3 shown in FIG. 5 are projected onto an object or objects in order to measure distances to a plurality of points in a wide angle of view, reflected light r1 and r3 enter the lens 3 at large incident angles, and the length of the sensor array 55 may be too short to receive the reflected light r1 and r3.

In this case, the number of sensor elements may be increased to, e.g., twice as many as the number of the sensor elements S1 to S4; however, as the number of the sensor elements increases, the numbers of the sorting units, accumulation units, pixels of the charge transfer unit 56, and pixels of the ring-shaped transfer unit 7 must be increased, which makes the configuration complicated. Further, since one circulation of charges in the ring-shaped transfer unit 7 should synchronize with one on/off operation of the light-emitting device 1, the charging period is lengthened as the number of pixels of the ring-shaped transfer unit 7 is increased, and it takes a long time to complete one distance measuring operation. In addition, since the amount of charge which can be discharged in one circulation of the ring-shaped transfer unit 7 by the skim unit 8 is fixed, the ability of removing charges due to external light deteriorates, thus the precision of a distance measuring operation is impaired.

To overcome the above problem, an apparatus in which the number of pixels of the sensor array is increased for performing a multi-point distance measuring operation while maintaining the number of pixels of a ring-shaped transfer unit as that in the apparatuses as those shown in FIG. 5 is disclosed in the Japanese Patent Application Laid-Open No. 8-320223. In the apparatus, however, more transfer pixels of a linear transfer unit for transferring charges are necessary in addition to the transfer pixels A1 to A8, thus, the size of the chip becomes large. Furthermore, it is necessary to increase the driving frequency of the transfer pixels to a higher frequency, e.g., twice higher than the driving frequency of the ring-shaped transfer unit, which complicates control of the apparatus.

SUMMARY OF THE INVENTION

The present invention has been made in consideration of the above situation, and has as its object of the present invention to make it possible to perform a multi-point distance measuring operation without increasing the number of pixels of the ring-shaped transfer unit, decreasing the driving frequency, and increasing the size of the chip. It is another object of the present invention to shorten the time to perform a multi-point distance measuring operation.

According to the present invention, the foregoing object is attained by providing a sensor apparatus comprising: a sensor array having a plurality of photoelectric conversion elements; a first transfer unit, having a plurality of transfer sections, for transferring charges generated by the plurality of photoelectric conversion elements; a second transfer unit, having a plurality of transfer sections, for integrating charges transferred by the first transfer unit; and a selection unit for selecting photoelectric conversion elements out of the plurality of photoelectric conversion elements and transferring charges generated by the selected photoelectric conversion elements to the first transfer unit, wherein a number of the transfer sections of the first transfer unit is greater than a number of the transfer sections of the second transfer unit.

Further, the foregoing object is also attained by providing a method of controlling a sensor apparatus having a sensor array having a plurality of photoelectric conversion elements, a first transfer unit, having a plurality of transfer sections, for transferring charges generated by the plurality of photoelectric conversion elements, and a second transfer unit, having a plurality of transfer sections which are fewer than the transfer sections of the first transfer unit, for integrating charges transferred by the first transfer unit, the method comprising: a step of grouping the plurality of photoelectric conversion elements into a plurality of groups; a step of selecting photoelectric conversion elements which belong to a predetermined group; and a step of transferring charges generated by the selected photoelectric conversion elements to the first transfer unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

<First Embodiment>

Figure 1:
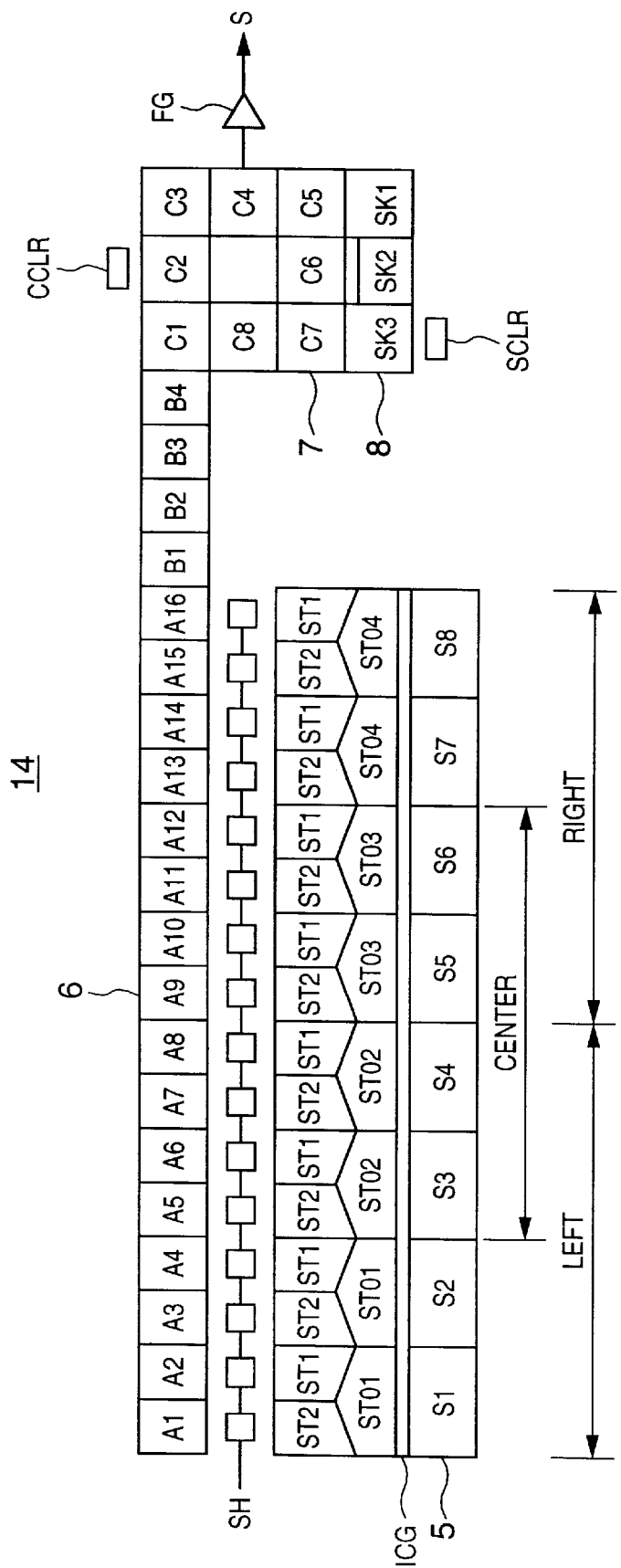
FIG. 1 is a diagram illustrating a configuration of a sensor apparatus according to a first embodiment of the present invention.
Figure 5:
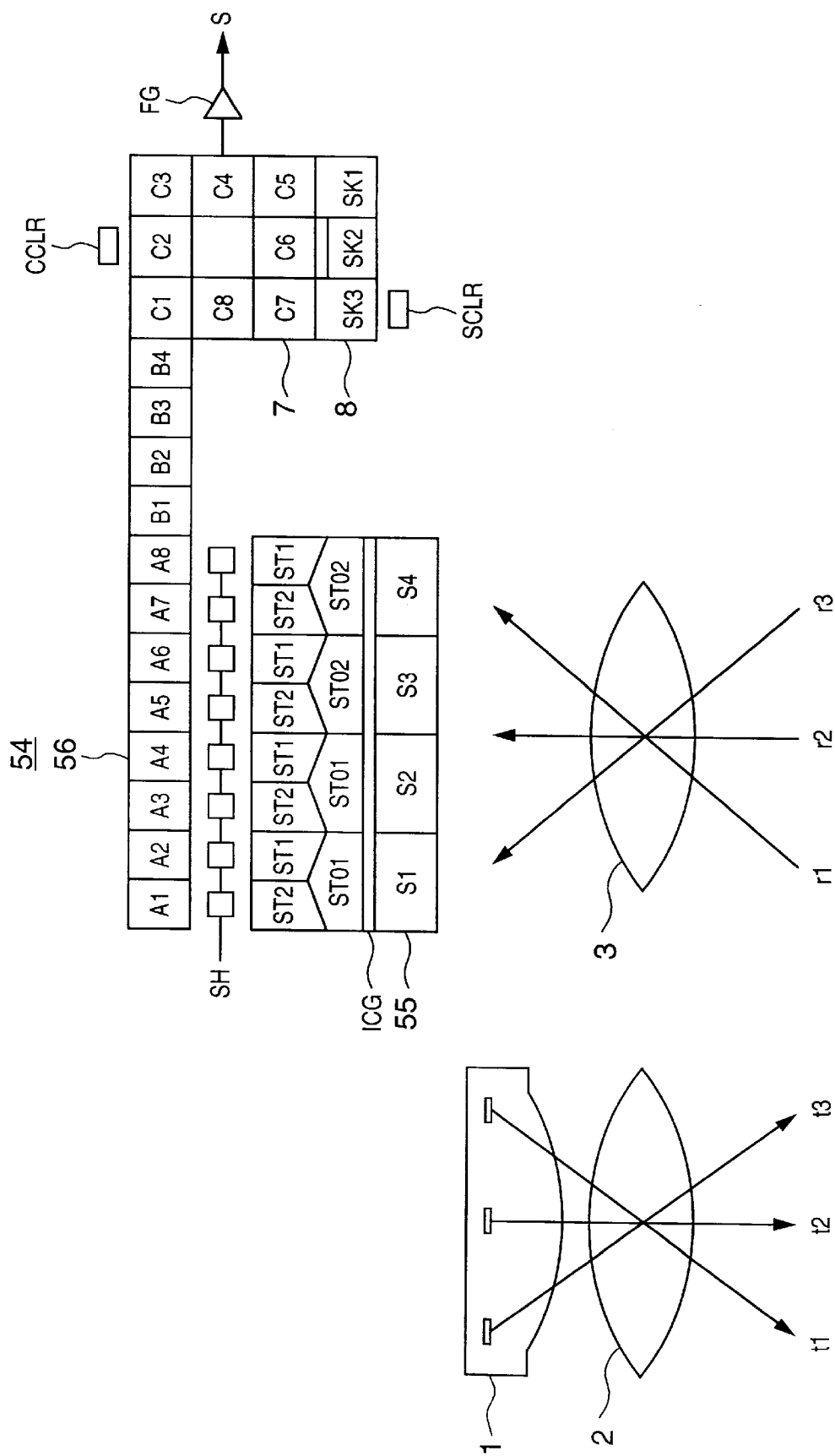
FIG. 5 is a diagram illustrating a configuration of a conventional sensor apparatus.

FIG. 1 is a diagram illustrating a brief configuration of a sensor apparatus according to the first embodiment. In FIG. 1, the same units and elements as those in FIG. 5 are referred to by the same reference numerals.

Referring to FIG. 1, a sensor array 5 of a sensor apparatus 14 comprises eight sensor elements S1 to S8. Further, a sorting unit ST01 is provided for each of the sensor elements S1 and S2, a sorting unit ST02 is provided for each of the sensor elements S3 and S4, a sorting unit ST03 is provided for each of the sensor elements S5 and S6, and a sorting unit ST04 is provided for each of the sensor elements S7 and S8.

For each of the sorting units ST01 to ST04, accumulation units ST1 and ST2 are provided, and for the respective accumulation units ST1 and ST2, transfer pixels A1 to A16 of the charge transfer unit 6 are provided. Between the sixteen accumulation units ST1 and ST2 and the sixteen transfer pixels A1 to A16, sixteen shift gates are provided. The electronic shutter ICG is for controlling the amount of charge to be accumulated when the charge converted from light is very large. The electronic shutter ICG also has a function of draining charges generated by the sensor elements S1 to S8 during the initialization, performed in advance of integration, of the pixels C1 to C8 of the ring-shaped transfer unit 7. The sorting units ST01 to ST04 do not operate during the initialization so that no charge is transferred to the accumulation units ST1 and ST2. Note, the light-emitting device 1, the projection lens 2, and the light-receiving lens 3, shown in FIG. 5, are not shown in FIG. 1; however, these elements are also provided similarly to FIG. 5.

Figure 2:
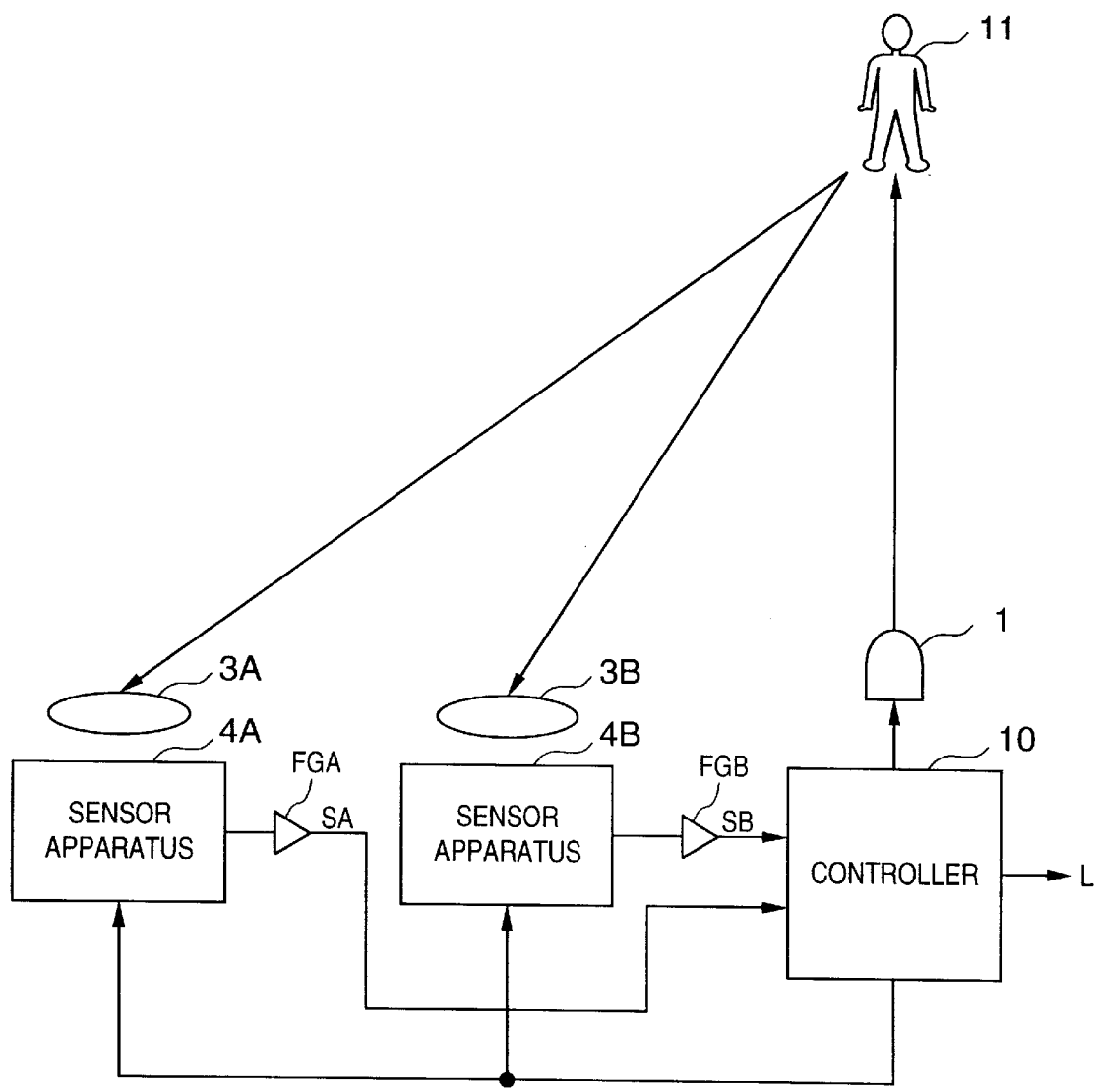
FIG. 2 shows a brief configuration of a distance measuring apparatus which includes two sensor apparatuses.

FIG. 2 shows a brief configuration of the distance measuring apparatus using the two sensor apparatuses 14 as shown in FIG. 1.

Referring to FIG. 2, first and second sensor apparatuses 4A and 4B, each having a configuration as shown in FIG. 1, are arranged at a predetermined interval. A controller 10 controls the sensor apparatuses 4A and 4B, and, when performing a distance measuring operation in the active mode, on/off of the light-emitting device 1. Light emitted from the light-emitting device 1 is projected on an object 11. Reflected light from the object 11 is received by the sensor apparatuses 4A and 4B via light-receiving lenses 3A and 3B, and charges obtained as a result of photoelectric conversion are transferred and integrated, then outputted as signals SA and SB via amplifiers FGA and FGB. The controller 10 performs a correlation operation on the signals SA and SB to obtain a distance L to the object 11.

Next, an operation of the sensor apparatus 14 is explained in detail with reference to FIG. 1.

The sensor elements S1 to S8 of the sensor array 5 are grouped into four groups each having adjoining two sensor elements, and two groups out of the four groups are sequentially selected by the sorting units ST01 to ST04, as shown in the following table 1, in each distance measuring operation. More specifically, for receiving the light r3, shown in FIG. 5, the sensor elements S1 to S4 which are in the left portion of the sensor array 5 are selected, and for receiving the light r2, the sensor elements S3 to S6 which are in the central portion of the sensor array 5 are selected, and for receiving the light r1, the sensor elements S5 to S8 which are in the right portion of the sensor array 5 are selected. Note that there are overlapping portions between two adjoining portions, namely, between the left portion and the central portion and between the central portion and the right portion. The charges generated in the selected portion are transferred to the pixels A1 to A16.

TABLE 1

|        | ST01 | ST02 | ST03 | ST04 |
|--------|------|------|------|------|
| Left   | O    | O    | X    | X    |
| Center | X    | O    | O    | X    |
| Right  | X    | X    | O    | O    |

In the table 1, "O" denotes "select", and "X" denotes "not select".

When integration starts after the initialization of the pixels C1 to C8, among the charges generated by the sensor S1 to S8 during the ON period of the light-emitting device 1 (FIG. 2), charges selected by the sorting units ST01 to ST04 in accordance with the table 1 are transferred to the accumulation units ST2. The charges generated by the sensor elements which are not selected are drained by the electronic shutter ICG. Similarly, among charges generated by the sensor elements S1 to S8 during the OFF period of the light-emitting device 1, charges selected by the sorting units ST01 to ST04 are transferred to the accumulation units ST1. The charges generated by the sensor elements which are not selected are also drained by the electronic shutter ICG.

The charges, transferred to the pairs of the accumulation units ST1 and ST2, are transferred to the transfer pixels A1 to A16. The transferred charges are shifted toward the pixels C1 to C8 of the ring-shaped transfer unit 7 via the transfer pixels B1 to B4. The light emission is performed in synchronization with the transference of the charges, and the charges obtained from the sensor elements S1 to S8 during each ON/OFF operation of the light-emitting device 1 are respectively integrated in the pixels C1 to C8.

In the first embodiment, not all the charges generated during each ON/OFF operation of the light-emitting device 1 are transferred to the transfer pixels A1 to A16, as described above. More specifically, charges generated by four sensor elements are transferred to eight pixels out of the sixteen pixels A1 to A16, and shifted toward the pixels C1 to C8, and no charge is transferred to the rest of the pixels A1 to A16. Therefore, charges transferred to the eight pixels out of the pixels A1 to A16 are shifted to the pixels C1 to C8 and integrated there without being mixed with charges of different sensor elements.

Further, the skim unit 8 removes a predetermined amount of charge in response to a signal SCLR when the amounts of each pair of charges obtained while the light-emitting device is on and while it is off are large, to prevent the pixels C1 to C8 from being saturated. Furthermore, the difference between the charges, outputted from the accumulation units ST1 and ST2, and integrated in the pixels C1 to C8, are obtained, thereby obtaining a signal component corresponding to a charge due to light emitted by the light-emission device Note, in the first embodiment, the eight sorting units ST01 to ST04 which operate in four different patterns by two units are provided for the sensor elements S1 to S8, and the two accumulation units ST1 and ST2 are provided for each sensor element. However, the present invention is not limited to this, and the number of elements and units may be increased.

According to the first embodiment as described above, even though the number of sensor elements of a sensor array is increased, it is not necessary to increase the number of pixels of a ring-shaped transfer unit; accordingly, a multi-point distance measuring operation can be realized without increasing the size of a chip nor increasing the driving frequency of the sensor apparatus.

Further, by grouping the sensor array in more groups greater than two, and transferring charges obtained from two or more adjoining groups, it is possible to freely cope with a multi-point distance measuring operation for measuring distances to a plurality of positions (objects) of an image formed on the sensor arrays or the distance to an object whose image forming positions on the sensor arrays changes in correspondence with the distance to the object.

Furthermore, by providing a discharging unit for skimming a predetermined amount of charge from a ring-shaped transfer unit, it is possible for the ring shaped CCD to integrate changes without being saturated, and an output signal with less noise is obtained. Since this configuration is capable of removing external noises, it is possible to perform a distance measuring operation with high precision.

In addition, two charge accumulation units provided for each photoelectric conversion element of a sensor array make it easier to separately integrate charges, generated during an on period and an off period of the light-emitting device, in synchronization with the on/off operation.

<Second Embodiment>

With the configuration which transfers charges only from selected sensor elements of the sensor array 5 to the ring-shaped transfer unit 7, as described in the first embodiment, when the same transfer operation is repeated in the active mode and in the passive mode, the total of six charge integration operations, specifically, three in the active mode and three in the passive mode, have to be performed. Especially, when luminance of an object or objects is low, it takes a long time to integrate charges in the passive mode, which causes a time gap, since image sensing operation is not active until the focusing is completed. In such cases, an operator may miss an opportunity to take a desired image. Further, in the passive mode, two substantially identical data are obtained from each sensor element, which can not be used for taking a difference.

Accordingly, in the second embodiment, transference of charges from the sensor elements S1 to S8 is controlled differently in the active mode and in the passive mode.

Figure 3:
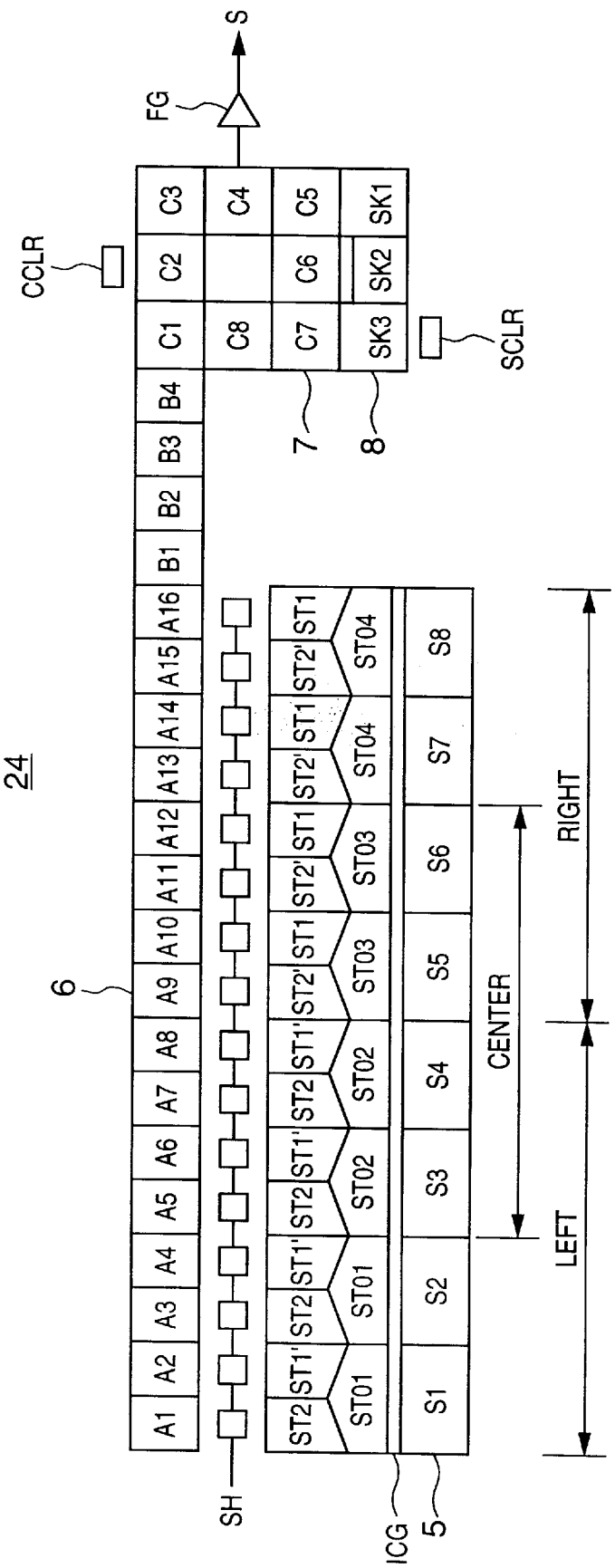
FIG. 3 is a diagram illustrating a configuration of a sensor apparatus according to a second embodiment of the present invention.

FIG. 3 is a diagram illustrating a brief configuration of a sensor apparatus according to the second embodiment. In FIG. 3, the same units and elements as those in FIG. 5 are referred to by the same reference numerals.

Referring to FIG. 3, the sensor array 5 of a sensor apparatus 24 comprises the eight sensor elements S1 to S8. Further, the sorting unit ST01 is provided for each of the sensor elements S1 and S2, the sorting unit ST02 is provided for each of the sensor elements S3 and S4, the sorting unit ST03 is provided for each of the sensor elements S5 and S6, and the sorting unit ST04 is provided for each of the sensor elements S7 and S8.

For each of the sorting units ST01 and ST02, accumulation units ST1' and ST2 are provided, and for each of the sorting units ST03 and ST04, accumulation units ST1 and ST2' are provided. Further, for the respective accumulation units ST1', ST2, ST1, and ST2', transfer pixels A1 to A16 of the charge transfer unit 6, having four transfer pixels B1 to B4, are provided. Between the sixteen accumulation units ST1, ST1', ST2 and ST2' and the sixteen transfer pixels A1 to A16, sixteen shift gates are provided. The electronic shutter ICG is for controlling the amount of charge to be accumulated when a charge converted from light is very large. The electronic shutter ICG also has a function of draining charges generated by the sensor elements S1 to S8 during the initialization, performed in advance of integration, of the pixels C1 to C8 of the ring-shaped transfer unit 7. The sorting units ST01 to ST04 do not operate during the initialization so that no charge is transferred to the accumulation units ST1, ST1', ST2 and ST2'. Note, the light-emitting device 1, the projection lens 2, and the light-receiving lens 3, shown in FIG. 5, are not shown in FIG. 3; however, these elements are also provided similarly to FIG. 5.

It is possible to configure the distance measuring apparatus as shown in FIG. 2 using two sensor apparatuses, each having the above configuration. An operation of the distance measuring apparatus is the same as that explained in the first embodiment; therefore, the explanation of it is omitted.

Next, an operation of the sensor apparatus 24 according to the second embodiment is explained in detail with reference to FIG. 3.

The sensor elements S1 to S8 of the sensor array 5 are grouped into four groups each having adjoining two sensor elements, and two groups out of the four groups are sequentially selected by the sorting units ST01 to ST04, as shown in the following table 2, in each distance measuring operation, in the active mode. More specifically, for receiving the light r3 shown in FIG. 5, the sensor elements S1 to S4 which are in the left portion of the sensor array 5 are selected, and for receiving the light r2, the sensor elements S3 to S6 which are in the central portion of the sensor array 5 are selected, and for receiving the light r1, the sensor elements S5 to S8 which are in the right portion of the sensor array 5 are selected. Note that there are overlapping portions between two adjoining portions, namely, between the left portion and the central portion and between the central portion and the right portion. The charges generated in the selected portion are transferred to the pixels A1 to A16.

TABLE 2

|  | ST01 | ST02 | ST03 | ST04 | ST1 | ST2' | ST1' | ST2 |
|---|---|---|---|---|---|---|---|---|
| ACTIVE | | | | | | | | |
| Left | O | O | X | X | O | O | O | O |
| Center | X | O | O | X | O | O | O | O |
| Right | X | X | O | O | O | O | O | O |
| PASSIVE | O | O | O | O | O | X | X | O |

In the table 2, "O" denotes "select", and "X" denotes "not select".

Next, operation of the second embodiment is explained.

First, the distance measuring operation in the active mode using the light-emitting device 1 (FIG. 2) is explained. In this case, all the accumulation units ST1', ST2, ST1 and ST2' operate, as shown in the table 2.

When integration starts after the initialization of the pixels C1 to C8, among the charges generated by the sensor S1 to S8 during the ON period of the light-emitting device 1, charges selected by the sorting units ST01 to ST04 in accordance with the table 2 are transferred to the accumulation units ST2 and ST2'. The charges generated by the sensor elements which are not selected are drained by the electronic shutter ICG. Similarly, among charges generated by the sensor elements S1 to S8 during the OFF period of the light-emitting device 1, charges selected by the sorting units ST01 to ST04 are transferred to the accumulation units ST1 and ST1', and the charges generated by the non-selected sensor elements are also drained by the electronic shutter ICG.

When charges are transferred to the pairs of the accumulation units ST1' and ST2, and/or ST1 and ST2' they are transferred to the transfer pixels A1 to A16. The transferred charges are shifted toward the pixels C1 to C8 of the ring-shaped transfer unit 7 via the transfer pixels B1 to B4. The light emission is performed in synchronization with the transference of the charges, and the charges obtained from the sensor elements S1 to S8 during each ON/OFF operation of the light-emitting device 1 are respectively integrated in the pixels C1 to C8.

More specifically, when the sorting units ST03 and ST04 are selected in the active mode, for instance, since charges are circulated in the ring-shaped transfer unit, at a given time, the charge of the accumulation unit ST1 of the sensor element S8 is transferred to the pixel C8 of the ring-shaped transfer unit 7; the charge of the accumulation unit ST2' of the sensor element S8, to the pixel C7; the charge of the accumulation unit ST1 of the sensor element S7, to the pixel C6; the charge of the accumulation unit ST2' of the sensor element S7, to the pixel C5; the charge of the accumulation unit ST1 of the sensor element S6, to the pixel C4; the charge of the accumulation unit ST2' of the sensor element S6, to the pixel C3; the charge of the accumulation unit ST1 of the sensor element S5, to the pixel C2; and the charge of the accumulation unit ST2' of the sensor element S5, to the pixel C1.

Note that not all the charges generated during each ON/OFF operation of the light-emitting device 1 are transferred to the transfer pixels A1 to A16, as described above. More specifically, charges generated by four sensor elements are transferred to eight pixels out of the sixteen pixels A1 to A16, and shifted toward the pixels C1 to C8, and no charge is transferred to the rest of the pixels A1 to A16. Therefore, charges transferred to the eight pixels out of the pixels A1 to A16 are shifted to the pixels C1 to C8 and integrated there without being mixed with charges of different sensor elements. With the aforesaid operation, it is possible to process charges of the sensor elements S1 to S8, twice as many as the sensor elements S1 to S4, shown in FIG. 5, using the ring-shaped transfer unit 7 having the same number of pixels as the conventional ring-shaped transfer unit shown in FIG. 5.

Further, the skim unit 8 removes a predetermined amount of charge in response to a signal SCLR when the amounts of each pair of charges obtained while the light-emitting device is on and while it is off are large, to prevent the pixels C1 to C8 from being saturated. Furthermore, the difference between the charges, outputted from the accumulation units ST1 and ST2, and integrated in the pixels C1 to C8, are obtained, thereby obtaining a signal component corresponding to the charge due to light emitted by the light-emission device 1.

When performing the distance measuring operation in the passive mode, skimming operation is not performed, further, the difference between the pairs of charges is not obtained, and only the charges accumulated in the accumulation units ST1 and ST2 are transferred and integrated, as shown in the table 2.

Namely, the accumulation units ST1' and ST2' are not operated in the passive mode, as shown in the table 2, and all the sorting units ST01 to ST04 operate. In this case, since charges are circulated in the ring-shaped transfer unit, at a given time, the charge of the accumulation unit ST1 of the sensor element S8 is transferred to the pixel C8 of the ring-shaped transfer unit 7; the charge of the accumulation unit ST1 of the sensor element S7, to the pixel C6; the charge of the accumulation unit ST1 of the sensor element S6, to the pixel C4; the charge of the accumulation unit ST1 of the sensor element S5, to the pixel C2; the charge of the accumulation unit ST2 of the sensor element S4, to the pixel C7; the charge of the accumulation unit ST1 of the sensor element S3, to the pixel C3; the charge of the accumulation unit ST2 of the sensor element S2, to the pixel C3; and the charge of the accumulation unit ST2 of the sensor element S1, to the pixel C1.

Thus, in the passive mode, the number of sensor elements which can be integrated in the ring-shaped transfer unit 7 is doubled compared with the active mode. Accordingly, in the passive mode, it is possible to perform correlation operation on the basis of signals obtained in one integrating operation.

Note, in the second embodiment, the eight sorting units ST01 to ST04 which operate in four different patterns by two units are provided for the sensor elements S1 to S8, and the two accumulation units ST1' and ST2 or ST1 and ST2' are provided for each sensor element. However, the present invention is not limited to this, and the number of elements and units may be increased.

Further, in the second embodiment as described above, charges stored in the accumulation units ST2 of the sensor elements S1 to S4 and charges stored in the accumulation units ST1 of the sensor elements S5 to S8 are integrated in the ring-shaped transfer unit 7; however, the present invention is not limited to this, and a charge stored in either one of the two accumulation units provided for each of the sensor elements S1 to S8 can be integrated. For instance, it is possible to configure the sensor apparatus so that charges stored in the accumulation units ST2 and ST1' of the sensor elements S1 to S8 are integrated.

According to the second embodiment as described above, in addition to the same effects as those of the first embodiment, since the charge is read out from one of the two accumulation units provided for each of the eight sensor elements of each sensor array, because the light-emitting device is not operated, charges corresponding to twice as many number as the sensor elements are separately integrated in the passive mode compared to the active mode. Accordingly, the time required for performing the distance measuring operation is shortened.

<Third Embodiment>

Next, the third embodiment will be explained.

Figure 4:
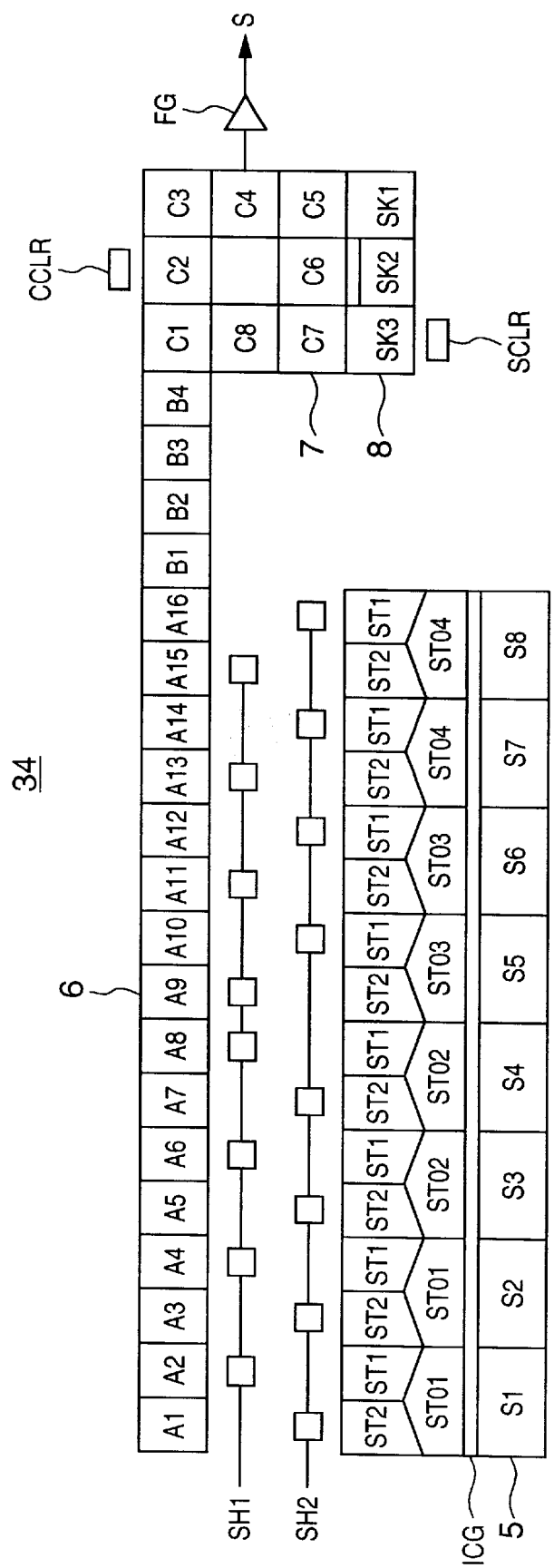
FIG. 4 is a diagram illustrating a configuration of a sensor apparatus according to a third embodiment of the present invention.

FIG. 4 shows a configuration of a sensor apparatus according to the third embodiment, and the same units and elements as those in FIG. 1 are referred to by the same reference numerals.

In FIG. 4, the accumulation units ST1 and ST2, and shift gates SH1 and SH2 are provided for each of the sorting units ST01 to ST04. Charges accumulated in the accumulation units ST1 of the sensor elements S1 to S4 and the accumulation units ST2 of the sensor elements S5 to S8 are transferred via the shift gates SH1, and charges accumulated in the accumulation units ST2 of the sensor elements S1 to S4 and the accumulation units ST1 of the sensor elements S5 to S8 are transferred via the shift gates SH2.

The following table 3 shows the control of the shift gates SH1 and SH2. The sorting units ST01 to ST04 are controlled in accordance with the table 2.

TABLE 3

|  | ST1 | ST2 | SH1 | SH2 |
|---|---|---|---|---|
| Active Mode | O | O | O | O |
| Passive Mode | O | O | X | O |

In the table 3, "O" denotes "select", and "X" denotes "not select".

With the configuration as described above, charges are not transferred via SH1 in the passive mode; therefore, similarly to the second embodiment, at a given time/the charge of the accumulation unit ST1 of the sensor element S8 is transferred to the pixel C8 of the ring-shaped transfer unit 7; the charge of the accumulation unit ST1 of the sensor element S7, to the pixel C6; the charge of the accumulation unit ST1 of the sensor element S6, to the pixel C4; the charge of the accumulation unit ST1 of the sensor element 5, to the pixel C2; the charge of the accumulation unit ST2 of the sensor element S4, to the pixel C7; the charge of the accumulation unit ST1 of the sensor element S3, to the pixel C5; the charge of the accumulation unit ST2 of the sensor element S2, to the pixel C3; and the charge of the accumulation unit ST2 of the sensor element S1 to the pixel C1.

According to the third embodiment as described above, the same effects as those of the second embodiment are achieved.

Note, in the first embodiment, the eight sorting units ST01 to ST04 which operate in four different patterns by two units are provided for the sensor elements S1 to S8, and the two accumulation units ST1 and ST2 are provided for each sensor element. However, the present invention is not limited to this, and the number of elements and units may be increased.

The present invention is not limited to the above embodiments and various changes and modifications can be made within the spirit and scope of the present invention. Therefore to appraise the public of the scope of the present invention, the following claims are made.

What is claimed is:

1. A sensor apparatus comprising:
   a sensor array having a plurality of photoelectric conversion elements;
   a first transfer unit, having a plurality of transfer sections, for transferring charges generated by said plurality of photoelectric conversion elements;
   a second transfer unit, having a plurality of transfer sections, for integrating charges transferred by said first transfer unit; and
   a selection unit for selecting photoelectric conversion elements out of said plurality of photoelectric conversion elements and transferring charges generated by the selected photoelectric conversion elements to said first transfer unit,
   wherein a number of the transfer sections of said first transfer unit is greater than a number of the transfer sections of said second transfer unit.

2. The sensor apparatus according to claim 1, wherein said selection unit groups said plurality of photoelectric conversion elements into a plurality of groups, selects photoelectric conversion elements which belong to a predetermined group, and transfers charges generated by the selected photoelectric conversion elements to said first transfer unit.

3. The sensor apparatus according to claim 2, wherein said selection unit groups said plurality of photoelectric conversion elements into three or more groups, selects photoelectric conversion elements which belong to two or more adjoining groups, and transfers charges generated by the selected photoelectric conversion elements to said first transfer unit.

4. The sensor apparatus according to claim 1, wherein said sensor array has two charge accumulation units for each of said plurality of photoelectric conversion elements, and charges transferred via said selection unit and accumulated in the charge accumulation units are transferred to said first transfer unit.

5. The sensor apparatus according to claim 4, further comprising a light-emitting device for emitting light while terming on and off at predetermined intervals, wherein the sensor apparatus is capable of operating in a first mode in which charges are accumulated while said light-emitting device is operating, and in a second mode in which charges are accumulated without operating said light-emitting device, and in said first mode, charges are accumulated in said two charge accumulation units separately when said light-emitting device is on and when said light-emitting device is off.

6. The sensor apparatus according to claim 5, wherein, in said first mode, said selection unit groups said plurality of photoelectric conversion elements into a plurality of groups, selects photoelectric conversion elements which belong to a predetermined group, and transfers charges generated by the selected photoelectric conversion elements to said first transfer unit.

7. The sensor apparatus according to claim 6, wherein, in said first mode, said selection unit groups said plurality of photoelectric conversion elements into three or more groups, selects photoelectric conversion elements which belong to two or more adjoining groups, and transfers charges generated by the selected photoelectric conversion elements to said first transfer unit.

8. The sensor apparatus according to claim 5, wherein, in said second mode, a charge is accumulated in one of said two charge accumulation units.

9. The sensor apparatus according to claim 5, wherein, in said second mode, said selection unit selects one of said two charge accumulation units, and transfers a charge accumulated in said selected accumulation unit to said first transfer unit.

10. The sensor apparatus according to claim 5, further comprising a differenciator for obtaining a difference between charges accumulated in said two charge accumulation units in said first mode.

11. The sensor apparatus according to claim 1, wherein said second transfer unit has a ring shape.

12. The sensor apparatus according to claim 1, further comprising a skimming unit for skimming a predetermined amount of charge from said second transfer unit.

13. A method of controlling a sensor apparatus having a sensor array having a plurality of photoelectric conversion elements, a first transfer unit, having a plurality of transfer sections, for transferring charges generated by said plurality of photoelectric conversion elements, and a second transfer unit, having a plurality of transfer sections which are fewer than the transfer sections of said first transfer unit, for integrating charges transferred by said first transfer unit, said method characterized by comprising:

a step of grouping said plurality of photoelectric conversion elements into a plurality of groups;

a step of selecting photoelectric conversion elements which belong to a predetermined group; and a step of transferring charges generated by the selected photoelectric conversion elements to said first transfer unit.

14. The method of controlling the sensor apparatus according to claim 13, wherein, in said grouping step, said plurality of photoelectric conversion elements are grouped into three or more groups, and in said selecting step, photoelectric conversion elements which belong to two or more adjoining groups are sequentially selected.

15. The method of controlling the sensor apparatus according to claim 13, wherein the sensor apparatus further comprises a light-emitting device for emitting light while terming on and off at predetermined intervals and said sensor array has two charge accumulation units for each of said plurality of photoelectric conversion elements; and wherein the method is capable of controlling the sensor apparatus in a first mode in which charges are accumulated while said light-emitting device is operating, and in a second mode in which charges are accumulated without operating said light-emitting device, and in said first mode, the method controls charges to the accumulated in said two charge accumulation units separately when said light-emitting device is on and when said light-emitting device is off.

16. The method of controlling the sensor apparatus according to claim 15, further comprising a step of enabling said grouping step and said selecting step in said first mode.

17. The method of controlling the sensor apparatus according to claim 15, wherein, in said second mode, the method controls a charge to be accumulated in one of said two charge accumulation units.

18. The method of controlling the sensor apparatus according to claim 15, further comprising:

a step of selecting one of said two charge accumulation units; and a step of transferring a charge accumulated in said selected accumulation unit to said first transfer unit.

19. The method of controlling the sensor apparatus according to claim 15, further comprising a step of obtaining a difference between charges accumulated in said two charge accumulation units in said first mode.

20. The method of controlling the sensor apparatus according to claim 13, further comprising a step of skimming a predetermined amount of charge from said second transfer unit.

* * * * *

UNITED STATES PATENT AND TRADEMARK OFFICE
CERTIFICATE OF CORRECTION

PATENT NO.   : 6,035,138
DATED        : March 7, 2000
INVENTOR(S)  : Akira Egawa It is certified that error appears in the above-identified patent and that said Letters Patent is hereby corrected as shown below:

Title page,
Item [57], ABSTRACT,
Line 4, "a less number of" should read -- fewer --.
Line 5, "the number of" should be deleted.
Line 8, "elements" should read -- elements, --.
Line 9, "groups" should read -- groups, --.

Column 1,
Line 16, "using" should read -- uses --.
Line 18, "charges" should read -- charges, as --.
Line 24, "at" should read -- at a --.
Line 25, "projects" should read -- is projected --.
Line 30, "incidents" should read -- is incident --.
Line 32, "S4" should read -- S4, --.
Line 34, "on" should read -- on, --.
Line 38, "off" should read -- off, --.
Line 47, "a" should read -- the --.
Line 55, "further" should read -- and are further --.

Column 2,
Line 6, "a" should read -- the --.
Line 12, "omitting" should read -- omitting the --.
Line 14, "taking" should read -- determining the --.
Line 20, "component" should read -- component, -- and "effects" should read -- the effects --.
Line 21, "removed" should read -- removed, --.
Line 25, "performing" should read -- performing a --.
Line 42, "units," should read -- units, the number of --.
Line 43, "units," should read -- units, the number of -- and "and" should read -- and the number of --.
Line 47, "with" should read -- with the --.
Line 54, "thus" should read -- thus impairing- -.
Line 55, "is impaired" should be deleted.
Line 56, "apparatus" should read -- apparatus, --.
Line 62, "5" should read -- 5, --.
Line 65, "A8," should read -- A8, and --.

UNITED STATES PATENT AND TRADEMARK OFFICE
CERTIFICATE OF CORRECTION

PATENT NO.    : 6,035,138
DATED         : March 7, 2000
INVENTOR(S)   : Akira Egawa It is certified that error appears in the above-identified patent and that said Letters Patent is hereby corrected as shown below:

Column 3,
Line 1, "twice" should read -- two times --.
Line 7, "of the present" should be deleted.
Line 8, "invention" should be deleted.
Lines 25 and 27, "a" should read -- the --.

Column 25,
Line 59, "device" should read -- device 1. --.

Column 6,
Line 19, "changes" should read -- charges --.
Line 38, "since" should read -- since an --.
Line 42, "can not" should read -- cannot --.

Column 8,
Line 21, "S8," should read -- S8 is transferred --.
Line 22, "S7," should read -- S7 is transferred--.
Line 24, "S7," should read -- S7 is transferred--.
Line 25, "S6," should read -- S6 is transferred --.
Line 27, "S6," should read -- S6 is transferred --.
Line 28, "S5," should read -- S5 is transferred --.
Line 29, "S5," should read -- S5 is transferred --.
Line 58, "mode," should read -- mode, the -- and "performed," should read
-- performed, and --.

Column 9,
Line 4, "S7," should read -- S7 is transferred --.
Line 7, "S5," should read -- S5 is transferred --.
Line 8, "S4," should read -- S4 is transferred --.
Line 10, "S3," should read -- S3 is transferred --.
Line 11, "S2," should read -- S2 is transferred --.
Line 13, "S I," should read -- S1 is transferred --.
Line 17, "perform" should read -- perform a --.

UNITED STATES PATENT AND TRADEMARK OFFICE
CERTIFICATE OF CORRECTION

PATENT NO. : 6,035,138
DATED : March 7, 2000
INVENTOR(S) : Akira Egawa

It is certified that error appears in the above-identified patent and that said Letters Patent is hereby corrected as shown below:

Column 10,
Line 12, "time/the" should read -- time the --.
Line 16, "S7," should read -- S7 is transferred --.
Line 17, "S6," should read -- S6 is transferred--.
Line 18, "5," should read -- S5 is transferred --.
Line 20, "S4," should read -- S4 is transferred --.
Line 21, "S3," should read -- S3 is transferred --.
Line 23, "S2," should read -- S2 is transferred --.
Line 24, "S1," should read -- S1 is transferred --.
Line 39, "appraise" should read -- apprise --.
Lines 57 and 58, "a number" should read -- the number --.

Column 11,
Line 14, "terming" should read -- turning --.
Line 46, "a" (second occurrence) should read -- the --.

Column 12,
Lines 2 -5, " unit, having a plurality of transfer sections which are fewer than the transfer sections of said first transfer unit, for integrating charges transferred by said first transfer unit, aid method characterized by comprising:" should read: -- unit, having a plurality of transfer sections wherein the number of transfer sections of said second transfer unit is smaller than the number of transfer sections of said first transfer unit, wherein said second transfer unit integrates charges transferred by said first transfer unit, said method comprising: --.
Line 22, "terming" should read -- turning --.

Signed and Sealed this

Thirty-first Day of August, 2004

JON W. DUDAS
*Director of the United States Patent and Trademark Office*